United States Patent
Coffey

(10) Patent No.: US 6,684,347 B1
(45) Date of Patent: Jan. 27, 2004

(54) METHOD AND SYSTEM FOR MDI CROSSOVER CONTROL

(75) Inventor: Joseph Coffey, Burnsville, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 495 days.

(21) Appl. No.: 09/635,881

(22) Filed: Aug. 10, 2000

(51) Int. Cl.$^7$ ................................................ H02H 3/05
(52) U.S. Cl. .......................................... 714/43; 370/247
(58) Field of Search ............................... 714/43, 4, 44, 714/56; 370/230, 242, 247, 248, 360, 419, 465

(56) References Cited

U.S. PATENT DOCUMENTS

| | | | |
|---|---|---|---|
| 5,410,535 A | * | 4/1995 | Yang et al. ..................... 713/1 |
| 5,469,437 A | | 11/1995 | Runaldue |
| 5,541,957 A | * | 7/1996 | Lau ............................. 375/258 |
| 5,568,525 A | * | 10/1996 | de Nijs et al. ................ 375/356 |
| 5,574,722 A | * | 11/1996 | Slykhouse et al. .......... 370/257 |
| 5,577,023 A | * | 11/1996 | Marum et al. ............... 370/225 |
| 5,742,587 A | * | 4/1998 | Zornig et al. ................ 370/235 |
| 5,745,670 A | | 4/1998 | Linde |
| 5,754,552 A | * | 5/1998 | Allmond et al. ............. 370/465 |
| 5,790,057 A | | 8/1998 | Linde et al. |
| 5,923,663 A | | 7/1999 | Bontemps et al. |
| 6,175,865 B1 | | 1/2001 | Dove et al. |
| 6,259,704 B1 | * | 7/2001 | Asahina et al. ............. 370/460 |

FOREIGN PATENT DOCUMENTS

| | | |
|---|---|---|
| EP | 0 915 599 A2 | 5/1999 |
| WO | WO 00/54419 | 9/2000 |

* cited by examiner

*Primary Examiner*—Dieu-Minh Le
(74) *Attorney, Agent, or Firm*—Merchant & Gould

(57) ABSTRACT

An MDI crossover incorporated in a converter that automatically detects if a cable connection has been made to an MDI port and if so, is the orientation of the cable correct. If the orientation of the cable is not correct, effecting a crossover. The crossover may be made by detecting when a cable has been plugged into a first device indicating that a signal connection has been made between a second device and the first device and determining if the orientation of the cable is correct with respect to a signal input and output of the first device. A crossover of the orientation of the cable is performed if it is determined that the orientation is not correct.

32 Claims, 4 Drawing Sheets

| CONDITION | $Q_1$ | $Q_2$ | LTF |
|---|---|---|---|
| NO CABLE | H | L | H |
| CABLE, MDI X-OVER | L | ⊓ | H |
| CABLE, NO MDI X-OVER | L | L | L |

METHOD AND SYSTEM FOR MDI CROSSOVER CONTROL

FIELD OF THE INVENTION

The present invention relates generally to telecommunications equipment and, more particularly, to an MDI crossover control for providing proper connections between telecommunication transmission lines.

BACKGROUND OF THE INVENTION

When two cable pairs are used for differential transmission of data between two devices, one pair is used for signal transmit and one pair is used for signal receive. This requires the pairs be reversed on one end to insure that the transmit signal path is connected to the receive signal path and vice versa. This is referred to as Medium Dependent Interface (MDI) crossover.

The original method used for MDI crossover was to use jumper wire on a cross connect termination block. The jumper wire was used to connect one pair to the other to achieve a crossover. When modular patching replaced cross-connect blocks, a special patch cable that reversed the signal pairs on one end had to be used to achieve a crossover function. The special patch cables created a logistical problem because special cordage was required.

A later method used a manual 4-pole double throw (4PDT) located in the network equipment. When actuated, it reverses the electrical connection between the cable pairs to achieve the MDI crossover. This is still a very common technique but does require that a knowledgeable operator configure the network equipment.

Network equipment manufacturers now "hard-wire" the MDI crossover into the equipment port so no special cables and switch mechanisms are required. This is also a common technique employed in network equipment that has a specific application such as an unmanaged hub. Another method of hardwiring is to use two separate connectors on the same port. One connector is wired with the normal MDI connection and the second connector is wired with the MDI pairs reversed. This method increases the physical size of the product and requires a knowledgeable operator to configure the network equipment.

Application Specific Integrated Circuits (ASIC) used for differential signal transmission may use a solid state switching matrix that is part of the IC. This matrix performs the same function as the manual switch previously mentioned. Unlike the switch, the matrix is actuated or switched automatically by an internal clock signal. This switching continues regardless if a connection has been made to another piece of network equipment. When the ASIC detects a link or integrity pulse from the other piece of network equipment, the switching is halted indicating link integrity pulses have been detected by the receiver, hence proper MDI signal orientation. ASIC solutions are generally proprietary and not commercially available for use with other types of integrated circuits.

SUMMARY OF THE INVENTION

According to a first aspect of the invention, there is provided a method of performing automatic crossover in a converter. The method includes the steps of:

(a) detecting when a cable has been plugged into the converter indicating that a signal connection has been made between a device and the converter;

(b) determining if the cable pair's orientation is correct with a signal input and output of the converter; and (c) if it is determined in step (b) that the orientation is not correct, effecting a crossover of the cable pairs.

According to a second aspect of the invention, there is provided a system for performing an automatic crossover in a converter. The system includes means for detecting when a cable has been plugged into the converter indicating that a signal connection has been made between a device and the converter, means for determining if the cable's orientation is correct with a signal input and output of the converter and means for effecting a crossover of the cable if it is determined that the cable's orientation is not correct.

According to a third aspect of the invention, there is provided an apparatus for performing automatic crossover in a converter. The apparatus includes a detector circuit that detects when a cable has been plugged into the converter indicating that a signal connection has been made between a device and the converter, a cable orientation detection circuit that determines if the cable's orientation is correct with a signal input and output of the converter, and a circuit for generating a steering pulse if it is determined that the orientation is not correct, wherein the steering pulse effects a crossover.

According to a fourth aspect of the invention, there is provided a crossover control circuit assembly. The assembly includes a medium dependent interface, a relay, a media converter and a detection circuit. The relay is coupled to the medium dependent interface and the media converter circuit is coupled to the relay. The media converter has a signal input and a signal output. The detection circuit is coupled between the media converter circuit and the relay. The detection circuit performs the steps of detecting when a cable has been plugged into the medium dependent interface, determining if the orientation of the cable is correct with respect to the signal input and output of the media converter, and if it is determined that the orientation of the cable is not correct, causing the relay to effect a crossover.

BRIEF DESCRIPTION OF THE DRAWINGS

The accompanying drawings, which are incorporated in and constitute a part of this specification, illustrate several aspects of the invention and together with the description, serve to explain the principles of the invention.

DETAILED DESCRIPTION OF THE PREFERRED EMBODIMENTS

Reference will now be made in detail to preferred embodiments of the present invention that are illustrated in the accompanying drawings. Whenever possible, the same reference numbers will be used throughout the drawings to refer to the same or like parts.

Figure 1:
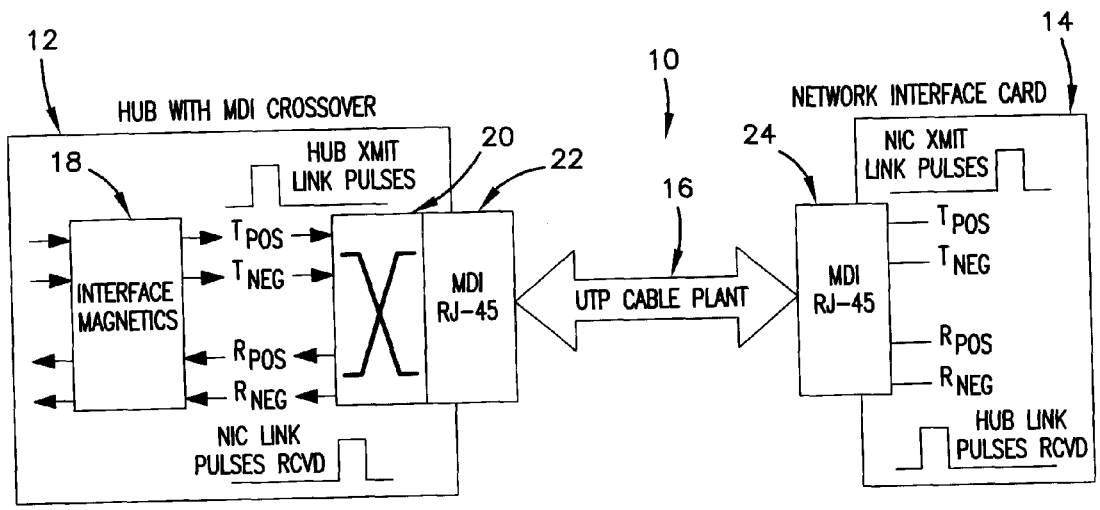
FIG. 1 is a diagram of a prior art system where crossover is hardwired in the hub.

FIG. 1 is a diagram of a prior art system where crossover is hardwired in the hub. As defined in IEEE 802.3, 10BASE-T requires two cable pairs for differential transmission of data between devices. One pair is used for signal transmit and one pair is used for signal receive. This requires that the pairs be reversed on one end to insure that a transmit signal path is connected to a receive signal path and vice versa. This is oftentimes referred to as medium dependent interface (MDI) crossover. MDI crossover can be achieved by a hardwired connection performed in the hub as shown in FIG. 1. The system 10 includes a hub 12, a network interface card 14 and a cable connection 16 coupling the hub 12 and network interface card 14. The cable 16 is an unshielded twisted pair cable. The hub 12 includes interface magnetics 18, a hardwired connection 20 and an MDI port 22 such as an RJ-45 port. The hardwired connection performs the crossover so that signals transmittal by the hub are coupled to the receive pairs of the network interface card and vice versa.

IEEE 802.3 also requires that each 10BASE-T port must transmit link integrity pulses. The link integrity pulses are detected by a far end device such as a network interface card (or a switch or hub port) indicating that a valid link exists. The far end device must also validate the link integrity pulses in terms of pulse duration and period as defined by the requirements established in IEEE 802.3. Since the far end device is also a 10BASE-T port, it must transmit link integrity pulse back to the originating (or near end) device. Both the near and far end device must detect each others link integrity pulses and validate them before two way data transmission can occur. The link integrity pulses are transmitted continuously regardless of the connection status of the MDI. Link integrity pulses are the only signal present during idle conditions.

Figure 2:
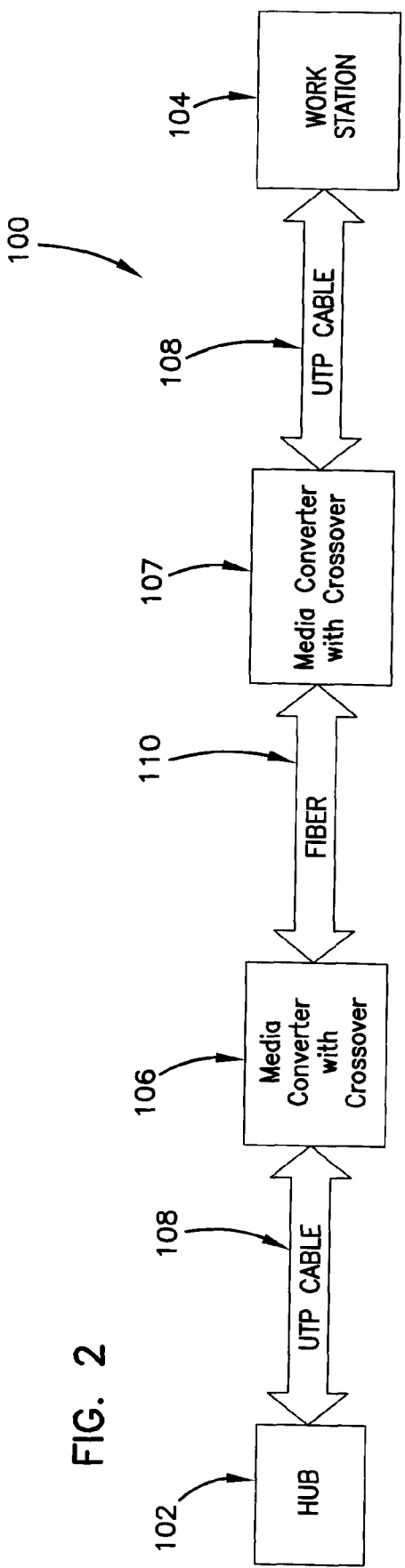
FIG. 2 is a diagram of an environment which includes automatic crossover control according to a preferred embodiment of the present invention.

A media converter designed to convert 10 Mb/s Ethernet from 10BASE-T to 10BASE-FL must be able to accommodate the differences in the MDI connection since these units can be used at either end of the 10BASE-T link. FIG. 2 is a diagram of an environment which includes automatic crossover control according to a preferred embodiment of the present invention. The environment includes a hub 102, a first media converter 106, a second media converter 107 and a work station 104. The first and second media converters 106, 107 include automatic MDI crossover according to the present invention. The hub 102 and first media converter 106 are coupled by unshielded twisted pair cable 108. The same is true for the second media converter 107 and work station 104. The first and second media converters 106, 107 are coupled together by optic fiber cable 110. The need for crossover control will be described using the following scenario as an example. Suppose the hub 102 is transmitting a signal to the work station 104. The transmit signal pairs of the hub 102 need to be operatively coupled to the receive signal pairs of the work station 104. The first media converter 106 detects that a cable 108 has been coupled to it. It then determines whether the orientation of the cable is correct with the input and output of the converter. If it is not, a crossover needs to be performed which will be described in detail hereinafter. Then, in the fiber, another crossover occurs as those of ordinary skill in this art are familiar. The second converter 107 determines if the work station has been coupled to it and if the orientation of the cable 108 is proper with respect to that converter. If not, another crossover occurs. Heretofore, crossover is normally accomplished using special, patch cords, 4 Form C manual switches, hardwired designs, or even proprietary designs in the integrated circuitry as previously described. It is always preferable for the MDI crossover operation to be automatically performed.

Figure 3:
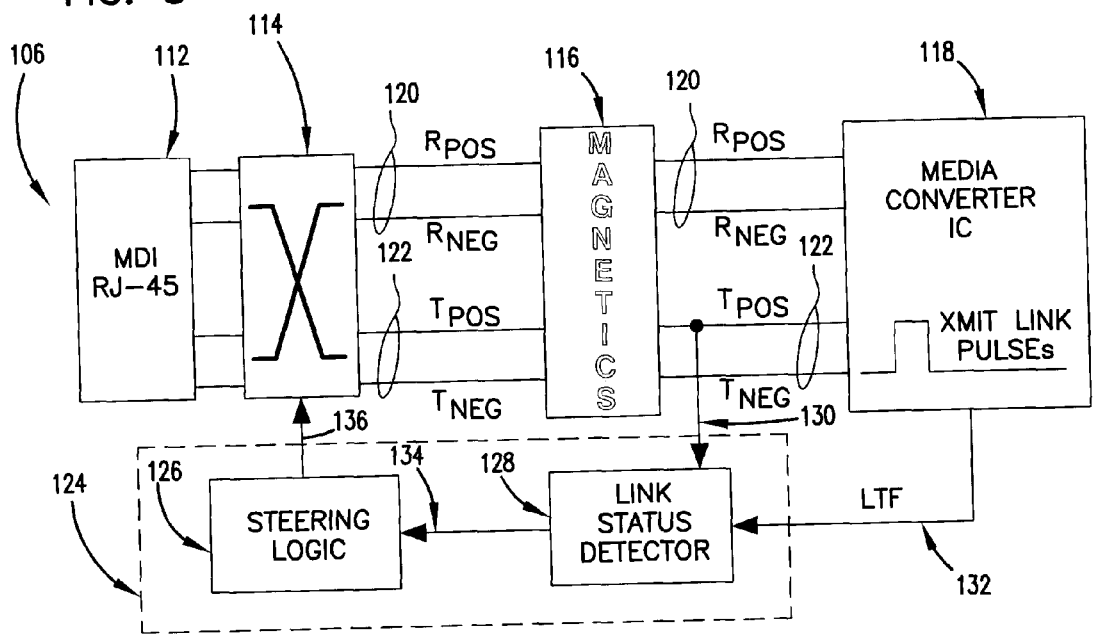
FIG. 3 is a circuit diagram of the automatic crossover control circuitry according to a preferred embodiment of the present invention incorporated in a media converter.

FIG. 3 is a circuit diagram of the automatic crossover control circuitry according to a preferred embodiment of the present invention. The circuitry 106 includes an MDI 112, an electromechanical device 114 such as a relay, interface magnetics 116, a media converter 118 and automatic crossover control circuit 124. The automatic crossover control circuit 124 includes a steering logic circuit 126 and a link status detector circuit 128.

A pair of receive wires 120 and a pair of transmit wires 122 couple the MDI 112, relay 114, interface magnetics 116 and media converter 118. The link status detector 128 is operatively coupled to a $T_{POS}$ lead 130 of the transmit pair 122 and is also coupled to the media converter 118 by a link test fail (LTF) lead 132. The link status detector 128 is coupled to the steering logic circuit 126 which in turn is coupled to the relay 114. The link status detector 128 outputs a control signal 134 to the steering logic 126 to control an output signal 136 coupled to the relay 114 as will be described in detail hereinafter.

The purpose of the MDI crossover control according to the present invention is to allow the device, in this preferred embodiment a media converter, to be used at either the hub or work station end of a 10BASE-T link and automatically adapt the UTP MDI to the correct wiring pattern necessary for normal operation. The crossover control circuit utilizes the fact that 10BASE-T compatible circuits generate a logic command to indicate a valid UTP link command as will be described hereinafter.

In general, to perform the MDI crossover, the circuit 106 must be able to perform the following steps:

(a) detect when a signal connection has been made between a 10BASE-T port (not shown) and the UTP MDI 112 of a media converter integrated circuit 106. This occurs when an RJ-45 patch cord has been used to make a connection between the 10BASE-T device and the media converter;

(b) determine if the orientation of the MDI cable is correct with the signal input and output of the media converter integrated circuit; and (c) generate a pulse or series of pulses to trigger the relay 114 to effect a crossover of the MDI cable pairs if required.

Now for the specifics of how the automatic crossover is made. The link status detector monitors the positive link pulse on the $T_{POS}$ lead 130 of the transmit pair 120. As dictated by the IEEE standards as previously described, the media converter 118 generates link pulses on its transmit pair 120. The signal amplitude of the link pulses generated by the media converter changes when a connection has been made to the MDI port 112 of the circuit 106.

It was found that the best place to monitor these link pulses was between the media converter integrated circuit 118 and the interface magnetics 116. It was found that monitoring link pulses in the circuit between the MDI 112 and the interface magnetics 116 is not practical for four primary reasons. First, the common mode noise in this part of the circuit is very high and unpredictable. This noise could mask the link pulse or cause a false activation of the link status detector. Second, this part of the circuit is subject to various safety requirements that require the circuitry to be subjected to destructive test potentials. Third, high voltage spikes can be present in this part of the circuit. These spikes can come from induce potential on the cable used for the MDI connection. Fourth, the amplitude of the link pulse between the MDI and the magnetics varies due to the length of cable used for the MDI connection. This makes predictable detection of a link pulse based on the signal amplitude difficult to accomplish.

As already described, media converter integrated circuits must comply with the requirements of IEEE 802.3 for 10BASE-T so they must also be designed to transmit and detect link integrity pulses. When the MDI 112 does not have a valid connection to another MDI it appears as an open circuit. The transformer coupling provided by the interface magnetics 116 results in an impedance reflection where no connection is made to the MDI 112. The amplitude of the link pulses generated by the media converter integrated circuit 118 at $T_{POS}$ 130 when there is no connection are thus much higher than when a valid MDI connection is in place. The detection of this difference in amplitude allows the first step, i.e., the connection status of the MDI, to be determined. Next it must be determined if the orientation of the MDI cable is correct with respect to the signal input and output of the media converter integrated circuit.

Figures 4, 7:
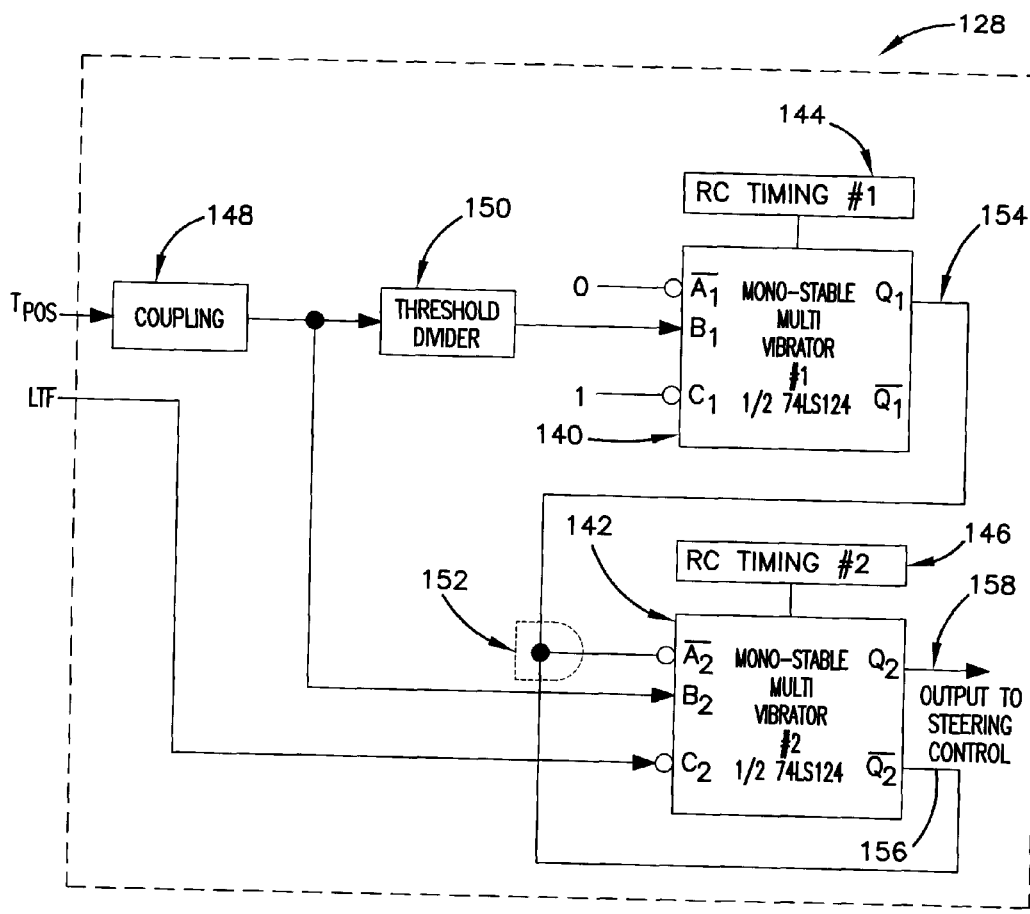
FIG. 4 is a detailed diagram of a link status detector according to a preferred embodiment of the present invention.
FIG. 7 is a table showing the various logic conditions of the link status detector circuit shown in FIG. 4.

FIG. 4 is a schematic of the link status detector circuit 128. The link status detector circuit 128 includes a coupling 148, a threshold divider 150, a first mono-stable multivibrator 140, a first timing circuit 144, a second mono-stable multivibrator 142, and a second timing circuit 146. The $T_{POS}$ lead is coupled by coupling circuit 148 to the input of the threshold divider 150 and the $B_2$ input of the second mono-stable multivibrator 142. The output of the threshold divider is coupled to the $B_1$ input of the first mono-stable multivibrator 140. The link test fail signal from the media converter integrated circuit 118 is coupled to the $C_2$ input of the second multivibrator 142. The $A_1$ input of the first multivibrator 140 is set at a logic low and the $C_1$ input of the first multivibrator 140 is set to a logic high. The $Q_1$ output of the first multivibrator 140 is coupled to the $A_2$ input and $Q_2$ output of the second multivibrator 142. The $Q_2$ output of the second multivibrator 142 is coupled to the steering logic circuit shown in FIG. 3.

The status link detector circuit 128 operates as follows. When no MDI connection exists, the $T_{POS}$ link pulse from the media converter integrated circuit is very high in amplitude. The link status detector circuit is designed to constantly re-trigger the first multivibrator 140 using the link pulse generated by the media converter integrated circuit. This re-triggering provides a constant logic high at the output of the multivibrator when no cable connection exists and disables the second multivibrator 142. When a signal connection is made between two valid MDIs, the signal amplitude of the local link pulse decreases below a level required to re-trigger the first mono-stable multivibrator 140. When this occurs, the output of the first multivibrator 140 drops to a logic low which enables the second multivibrator 142. To summarize, when an MDI connection exists, $Q_1$ is at logic low thereby enabling the second multivibrator 142 and when no connection exists $Q_1$ is at logic high thereby disabling the second multivibrator 142.

Figure 5A:
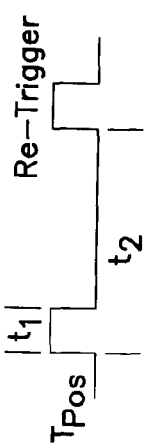
FIGS. 5(a), (b) are graphs of output pulses from a mono-stable multivibrator of the link status detector shown in FIG. 4.
Figure 5B:

A mono-stable multivibrator is typically a one-shot device. This means that once triggered, the multivibrator will generate an output pulse (i.e., a $Q_1$ logic transition) with a period based on a time constant established by the external RC timing circuit 144. To keep the output $Q_1$ at a constant logic high when no MDI connection exists, the output period at $Q_1$ must be longer than the period of time ($t_2$, see FIG. 5) a re-trigger pulse appears. The long output period is set by the time constant of the external RC timing circuit 144 linked to the first multivibrator 140. A typical link pulse (positive) is shown in FIG. 5. The time interval $t_1$ is approximately 100 nsec in duration and the period $t_2$ is approximately 16 msec therefore the time constant of the external RC timing circuit 144 for first multivibrator 140 must be greater than 16 msec to keep the multivibrator 140 re-triggered.

When an MDI connection does occur, the amplitude of the signal from the threshold divider 150 will no longer be able to re-trigger the first multivibrator 140. The time constant determined by the external timing circuit 144 decays and the output at $Q_1$ eventually returns to a low logic condition.

The $Q_1$ output 154 of the first multivibrator is coupled to the $A_2$ input of the second multivibrator 142. The $Q_2$ output of the second multivibrator 142 is also coupled to the $A_2$ input forming a "wired AND" condition. This connection forces the input at $A_2$ to follow a low logic condition from either $Q_1$ of the first multivibrator 140 or $Q_2$ of the second multivibrator. If $Q_1$ and $Q_2$ are high, the second multivibrator 142 will be triggered by the next link integrity pulse. After the second multivibrator 142 has been triggered, $Q_2$ goes low which prevents the second multivibrator from being re-triggered until the output period of $Q_2$ has expired.

The second mono-stable multivibrator 142 is used to generate steering pulses of a duration long enough to cause a latch to occur in the relay 114. Preferably, relay 114 is a 4 Form C latching relay. The trigger source for the second mono-stable multivibrator 142 is the locally generated 10BASE-T link pulses from the media converter integrated circuit. The wired AND connection shown in the attached diagram creates a feedback loop resulting in symmetrical steering pulses. In 10/100 Mb/s systems where auto-negotiation is utilized, locally generated link pulses cannot be used as a triggering source. An external trigger source such as a 1-second clock pulse must be used to allow the auto-negotiation device time to identify the signal after the MDI crossover. In either case, the output steering pulses are applied to the steering circuit. The LTF input is a logic command that is provided by the 10BASE-T device indicating that a valid link pulse has been detected. When this occurs, the LTF becomes logic 0 disabling the second mono-stable multivibrator 142. This stops the generation of steering pulse thereby halted the MDI crossover process.

Figure 6:
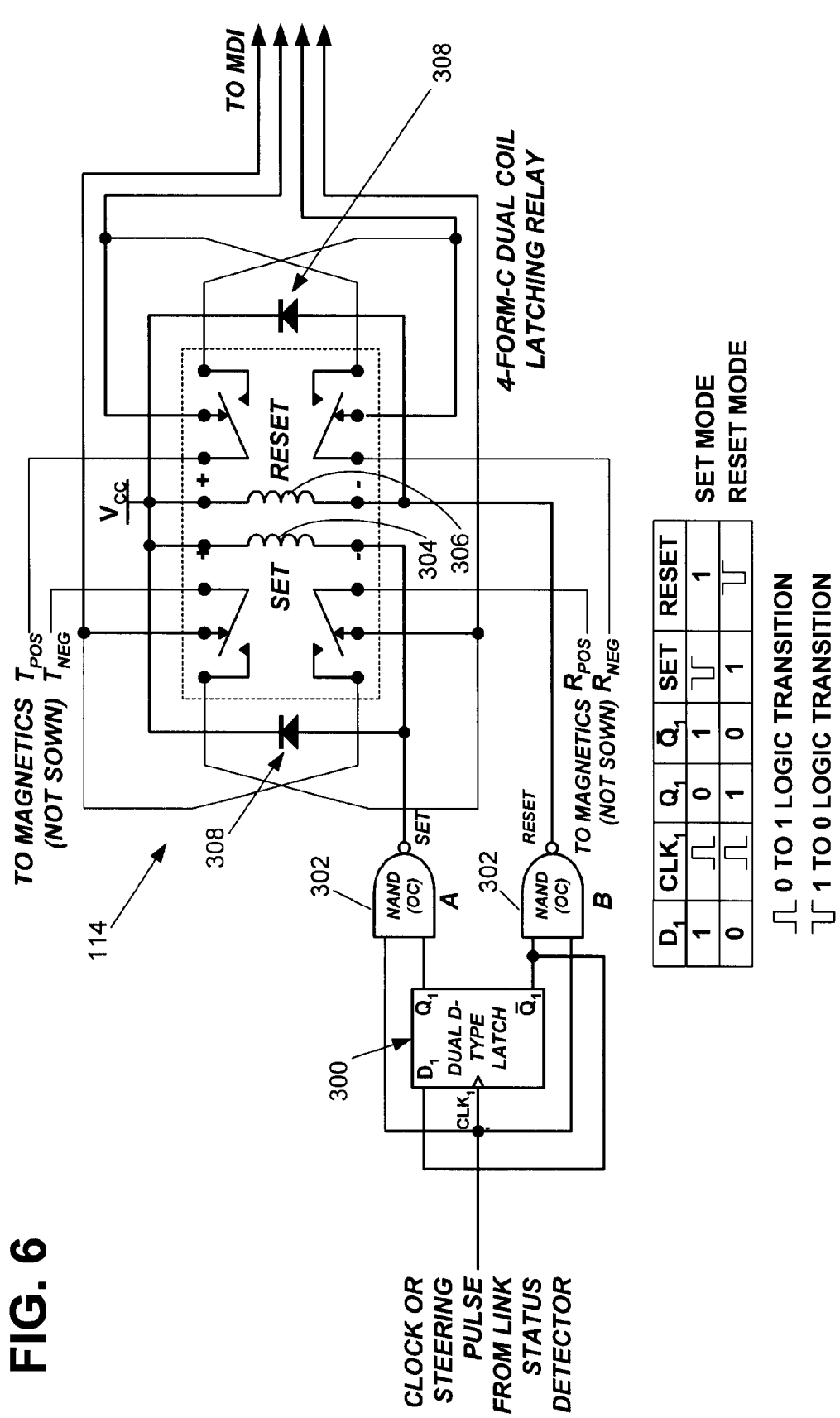
FIG. 6 is a functional schematic of the steering control.

The steering circuit shown in FIG. 6 consists of a single D-Type latch 300 and two NAND gates 302. The purpose of this steering circuit is to remember the last relay transition, either SET or RESET, and steer the next steering pulse to the correct relay latching coil. The use of the open collector NAND gates allow the relays coils to be driven by the steering logic with the use of discrete or secondary driving devices such as transistors or MOSFETs. The D-Type latch 300 in FIG. 6 is a one-bit latch that transfers the state of the input at $D_1$ to the output at $Q_1$ when a clock pulse is applied to the $CLK_1$ clock input. If the state at $D_1$ is at a logic 1, then the next clock pulse will cause the output at $Q_1$ to change from a logic 0 to a logic 1 state and vice versa for $Q_1$. As shown, the output $Q_1$ NOT is connected to the input at $D_1$. The $CLK_1$ input is also coupled to an input on each of the NAND gates 302. When a clock, or in this case a steering pulse, is applied to $CLK_1$, the logic 1 state at $D_1$ is transferred to the output at $Q_1$ causing $Q_1$ to be at a logic 1 state and $Q_1$ NOT to be at a logic 0 state. This transition of logic states between $Q_1$ and $Q_1$ NOT causes the clock or steering pulse to be steered and inverted at the outputs of NAND gates 302 A or B. The logic 1 at $Q_1$ is coupled to the input of NAND gate A. Since the clock or steering pulse has a long duration pulse, it is still in the logic 1 state and the output at NAND A goes to a logic 0 state for the duration of the clock or steering pulse. NAND gates 302 A and B are of an open collector type and used as momentary ON/OFF switches. A logic 0 on the output is essentially a low impedance path to ground. This allows the SET coil 304 of the relay 114 to conduct placing the relay 114 in the SET position. A logic 1 state on the output of either NAND gate is a high impedance or OFF condition.

After the SET transition, $Q_1$ is at a logic 1 and $Q_1$ NOT is at a logic 0 therefore $D_1$ is also at a logic 0. If the MDI crossover did not result in a valid link during the SET transition, another clock or steering pulse will be generated and applied to $CLK_1$. This will cause $Q_1$ to return to a logic 0 state and $Q_1$ NOT to return to a logic 1 state. The logic 1 at $Q_1$ NOT is coupled to the input of NAND gate B. Since the clock or steering pulse is still in the logic 1 state, the output at NAND B goes low for the duration of the clock or steering pulse. This allows the RESET coil 306 of the relay 114 to conduct placing the relay 114 in the RESET position.

The diodes 308 across the SET and RESET coils are used for suppression of counter EMF voltages that may be produced when wither coil is being de-energized.

The approach used in this MDI Crossover Control determines when a signal connection has been made by monitoring the amplitude of locally generated link pulses instead of constantly searching for a link pulse. This has the benefit of reduced power dissipation and reduction of wear on the relay.

FIG. 7 is a chart 200 of the various conditions at various points in the circuitry shown in FIG. 4. Column 202 indicates what is the condition, column 204 shows the logic level of the $Q_1$ output of the first multivibrator 140, column 206 shows the logic level of the $Q_2$ output of the second multivibrator 142, column 208 shows the link test fail signal state. Row 208 shows the condition when there is no cable coupled to the media converter. In that case $Q_1$ is high, $Q_2$ is low and the link test fail signal is high. Row 210 shows the condition when a cable is connected to the media converter but the orientation of the MDI cable is not correct so crossover is necessary, $Q_1$ goes low, $Q_2$ outputs a pulse to the steering unit that in turn causes the relay to switch. Row 212 shows the condition when a cable is connected to the media converter and the orientation of the cable is correct. In this case, $Q_1$ is low, $Q_2$ is low and the link test fail signal is low.

Having described preferred aspects and embodiments of the present invention, modifications and equivalents of the disclosed concepts may readily occur to one skilled in the art. However, it is intended that such modifications and equivalents be included within the scope of the claims which are appended hereto.

What is claimed is:

1. A method of performing automatic crossover in an electrical to optical converter, the method comprising the steps of:
   (a) detecting when a cable pair has been plugged into the electrical to optical converter indicating that a signal connection has been made between a device and the electrical to optical converter;
   (b) determining if the cable pair's orientation is correct with respect to a signal input and output of the electrical to optical converter; and
   (c) if it is determined in step (b) that the orientation is not correct, effecting a crossover of the cable pairs.

2. The method of claim 1 wherein step (a) comprises the step of monitoring outgoing link pulses generated by the electrical to optical converter.

3. The method of claim 1 wherein step (b) comprises monitoring a link test fail signal transmitted by the electrical to optical converter.

4. The method of claim 1 wherein step (c) comprises outputting a steering pulse from the electrical to optical converter to a relay that is coupled to the cable pairs and the steering pulse.

5. The method of claim 1 wherein step (b) does not occur unless a cable pair has been detected in step (a).

6. A system for performing an automatic crossover in an electrical to optical converter, the system comprising:
   means for detecting when a cable pair has been plugged into the electrical to optical converter indicating that a signal connection has been made between a device and the electrical to optical converter;
   means for determining if the cable pair's orientation is correct with respect to a signal input and output of the electrical to optical converter; and
   means for effecting a crossover of the cable pairs if it is determined that the cable pair's orientation is not correct.

7. The system of claim 6 wherein the means for detecting when a cable pair has been plugged into the electrical to optical converter comprises means for monitoring outgoing link pulses generated by the electrical to optical converter.

8. The system of claim 6 wherein the means for determining if the cable pair's orientation is correct comprises means for monitoring a link test fail signal transmitted by the electrical to optical converter.

9. The system of claim 6 wherein the means for effecting a crossover comprises means for outputting a steering pulse from the electrical to optical converter to a relay that is coupled to the cable pairs and the steering pulse causes the relay to switch.

10. The system of claim 6 wherein the means for effecting a crossover is not activated until the means for detecting when a cable pair has been plugged into the electrical to optical converter detects that a cable pair is plugged into the converter.

11. The system of claim 6 wherein the means for detecting when a cable pair has been plugged into the electrical to optical converter and the means for determining if the cable pair's orientation is correct comprises a link status detector coupled to the electrical to optical converter to receive a link pulse transmitted by the electrical to optical converter and a link test fail signal transmitted by the electrical to optical converter.

12. The system of claim 11 wherein the link status detector comprises:
    a first mono-stable vibrator coupled to the link pulse transmitted by the electrical to optical converter;
    a second mono-stable vibrator coupled to the link pulse transmitted by the electrical to optical converter and the link test fail signal transmitted by the electrical to optical converter, the second vibrator having an output that is coupled to a relay to effect a crossover; and
    the first vibrator having an output coupled to an input of the second vibrator wherein the first vibrator enables or disables the second vibrator through its output signal wherein when it has been determined that a cable pair has been plugged in, the link pulse decreases in amplitude which causes the output of the first vibrator to transition thereby enabling the second vibrator.

13. An apparatus for performing automatic crossover in an electrical to optical converter, the apparatus comprising:
    a detector circuit that detects when a cable has been plugged into the electrical to optical converter indicating that a signal connection has been made between a device and the electrical to optical converter;

a cable orientation detection circuit that determines if the cable's orientation is correct with respect to a signal input and output of the electrical to optical converter; and a circuit for generating a steering pulse if it is determined that the orientation is not correct, wherein the steering pulse effects a crossover.

14. The apparatus of claim 13 wherein the detector circuit is a first mono-stable multivibrator coupled to a link pulse generated by the electrical to optical converter.

15. The apparatus of claim 14 wherein the cable orientation detection circuit is a second mono-stable multivibrator having a first input coupled to the link pulse generated by the electrical to optical converter, a second input coupled to a link test fail signal from the electrical to optical converter, and a third input coupled to the output of the first mono-stable multivibrator wherein the cable orientation detection circuit only generates an output trigger signal if a connection has been detected and it is determined that the orientation of the cable is not correct.

16. A crossover control circuit assembly comprising:
a relay coupled to a medium dependent interface;
an electrical to optical media converter circuit coupled to the relay, the media converter circuit having a signal input and a signal output;
a detection circuit coupled between the media converter circuit and the relay, wherein the detection circuit performs the steps of:
(a) detecting when a cable has been plugged into the medium dependent interface;
(b) determining if the orientation of the cable is correct with respect to the signal input and output of the media converter circuit; and
(c) if it is determined that the orientation of the cable is not correct, causing the relay to effect a crossover.

17. The circuit assembly of claim 16 wherein the detection circuit comprises a link status detector circuit and a steering logic circuit wherein the link status detector circuit performs steps (a) and (b) an the steering control circuit performs step (c).

18. The circuit assembly of claim 17 wherein the link status detector circuit comprises:
a first multivibrator having an input and an output, the input coupled to a transmit signal lead of the media converter circuit to receive a link integrity pulse from the media converter circuit; and
a second multivibrator having a first, second and third input and a first and second output wherein the first input and the second output of the second multivibrator circuit are coupled to the output of the first multivibrator, the second input of the second multivibrator is coupled to the lead of the media converter circuit to receive the link integrity pulse from the media converter circuit and the third input is coupled to receive a link test fail signal from the media converter circuit and the first output of the second multivibrator is coupled to the steering logic circuit wherein the first multivibrator disables the second multivibrator whenever a cable is not coupled to the medium dependent interface and enables the second multivibrator whenever a cable is coupled to the medium dependent interface wherein when the second multivibrator is enabled it detects whether a link test fail signal is present at its third input and, if so, outputs a steering control signal at its first output.

19. The circuit assembly of claim 18 wherein the steering control circuit comprises:
a latch having a first input, a second input and a first and a second output;
a first gate having a first input, a second input and an output; and
a second gate having a first input, a second input and an output, wherein the first inputs of the latch, first gate and second gate receive the steering control signal output by the link status detector circuit, the second output of the latch is coupled to the second input of the second gate and the second input of the latch and the first output of the latch is coupled to the seconds input of the first gate wherein the output of the first gate is coupled to a set coil of the relay and the output of the second gate is coupled to a reset coil of the relay.

20. The circuit assembly of claim 19 wherein the latch is a dual D-type latch and the first and second gates are NAND gates.

21. A method of performing automatic crossover in a first device, the method comprising the steps of:
(a) detecting when a transmit and receive signal connection has been made between a second device and the first device;
(b) after detecting that a transmit and receive signal connection has been made between the second device and the first device, then beginning a determination of whether an orientation of the transmit and receive signal connection is correct with respect to a signal input and output of the first device; and
(c) if it is determined in step (b) that the orientation is not correct, effecting a crossover of the transmit and receive signal connection.

22. The method of claim 21 wherein the first device comprises a converter.

23. The method of claim 21 wherein step (a) comprises the step of monitoring outgoing link pulses generated by the first device and step (b) comprises monitoring a link test fail signal transmitted by the first device.

24. The method of claim 21 wherein step (c) comprises outputting a steering pulse from the first device to a relay that is coupled to the transmit and receive signal connection and the steering pulse.

25. A system for performing an automatic crossover in a first device, the system comprising:
means for detecting when a cable pair has been plugged into the first device indicating that a signal connection has been made between a second device and the first device;
means for determining if an orientation of the cable pair is correct with respect to a signal input and output of the first device wherein the means for determining if the orientation of the cable pair is correct is not activated until the means for detecting when a cable pair has been plugged into the first device detects that a cable pair is plugged into the first device; and
means for effecting a crossover of the cable pair if it is determined that the orientation of the cable pair is not correct.

26. The system of claim 25 wherein the means for detecting when a cable pair has been plugged into the first device comprises means for monitoring outgoing link pulses generated by the device.

27. The system of claim 25 wherein the means for determining if the orientation of the cable pair is correct comprises means for monitoring a link test fail signal provided by the first device.

28. The system of claim 25 wherein the first device comprises a converter.

29. The system of claim 25 wherein the means for detecting when a cable pair has been plugged into the first device and the means for determining if the orientation of the cable pair is correct comprises a link status detector coupled to the first device to receive a link pulse transmitted by the first device and a link test fail signal transmitted by the first device.

30. The system of claim 29 wherein the link status detector comprises:

a first mono-stable multivibrator coupled to the link pulse transmitted by the first device;

a second mono-stable multivibrator coupled to the link pulse transmitted by the first device and the link test fail signal transmitted by the first device, the second mono-stable multivibrator having an output that is coupled to a relay to effect a crossover;

the first mono-stable multivibrator having an output coupled to an input of the second mono-stable multivibrator wherein the first mono-stable multivibrator enables or disables the second mono-stable multivibrator through its output signal wherein when it has been determined that a cable pair has been plugged in, the link pulse decreases in amplitude which causes the output of the first mono-stable multivibrator to transition thereby enabling the second mono-stable multivibrator.

31. An apparatus for performing automatic crossover in a first device, the apparatus comprising:

a first mono-stable multivibrator coupled to a link pulse generated by the first device that detects when a cable has been plugged into the first device indicating that a signal connection has been made between a second device and the first device;

a second mono-stable multivibrator that determines if an orientation of the cable is correct with respect to a signal input and output of the first device having a first input coupled to the link pulse generated by the first device, a second input coupled to a link test fail signal from the first device, and a third input coupled to the output of the first mono-stable multivibrator wherein the second mono-stable multivibrator only generates an output trigger signal after a signal connection has been made as detected by the first mono-stable multivibrator and it is determined that the orientation of the cable is not correct; and a circuit for generating a steering pulse if it is determined that the orientation is not correct, wherein the steering pulse effects a crossover.

32. The apparatus of claim 31 wherein the first device comprises a converter.

* * * * *

UNITED STATES PATENT AND TRADEMARK OFFICE
CERTIFICATE OF CORRECTION

PATENT NO. : 6,684,347 B1
DATED : January 27, 2004
INVENTOR(S) : Coffey

It is certified that error appears in the above-identified patent and that said Letters Patent is hereby corrected as shown below:

Column 9,
Line 41, "(a) and (b) an the steering" should read -- (a) and (b) and the steering --

Column 10,
Line 13, "is coupled to the seconds input of the first gate" should read -- is coupled to the second input of the first gate --

Signed and Sealed this

Twenty-fifth Day of May, 2004

JON W. DUDAS
*Acting Director of the United States Patent and Trademark Office*